United States Patent
Adachi et al.

(10) Patent No.: US 7,436,431 B2
(45) Date of Patent: Oct. 14, 2008

(54) TERMINAL APPARATUS AND IMAGE INFORMATION SERVER

(75) Inventors: Makoto Adachi, Yokohama (JP); Hiroshi Shimizu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 807 days.

(21) Appl. No.: 10/766,849

(22) Filed: Jan. 30, 2004

(65) Prior Publication Data

US 2004/0252192 A1    Dec. 16, 2004

(30) Foreign Application Priority Data

Jun. 12, 2003    (JP) ............... 2003-167255

(51) Int. Cl.
*H04N 7/18* (2006.01)
*G06F 7/00* (2006.01)

(52) U.S. Cl. .................... 348/148; 701/35

(58) Field of Classification Search ........... 348/148, 348/149, 157, 143; 340/435, 436; 701/35, 701/213
See application file for complete search history.

(56) References Cited

U.S. PATENT DOCUMENTS

| | | | |
|---|---|---|---|
| 6,246,933 B1 * | 6/2001 | Bague | 701/35 |
| 6,490,513 B1 * | 12/2002 | Fish et al. | 701/35 |
| 6,615,134 B2 | 9/2003 | Ando | |
| 6,630,884 B1 * | 10/2003 | Shanmugham | 340/436 |
| 2003/0125854 A1 * | 7/2003 | Kawasaki et al. | 701/35 |

FOREIGN PATENT DOCUMENTS

| | | |
|---|---|---|
| JP | 09-022497 | 1/1997 |
| JP | 10-073441 | 3/1998 |
| JP | 11-134343 | 5/1999 |
| JP | 11-160080 | 6/1999 |
| JP | 2001-339334 | 12/2001 |
| JP | 2003-123190 | 4/2003 |

\* cited by examiner

*Primary Examiner*—Grim S Philippe
(74) *Attorney, Agent, or Firm*—Antonelli, Terry, Stout & Kraus, LLP.

(57) ABSTRACT

On a vehicle, such as a car, etc., a camera, a navigation, communication function are mounted, and an image picked up from the car is uploaded to a server. Road information uploaded from each car is collected up to the server. Each the car downloads the information existing in the server at the time when it is running. With provision of such the system, the car itself can confirm the condition of a spot through which it will pass from now, by using the information which is picked up by other car passing through that spot just before.

4 Claims, 12 Drawing Sheets

TERMINAL APPARATUS AND IMAGE INFORMATION SERVER

BACKGROUND OF THE INVENTION

The present invention relates to an information uploading/downloading system, and it relates to, in particular, an uploading/downloading system of a pick-up image of a road condition, with utilizing a camera, a navigation system, and a communication function provided in a vehicle, such as a car, etc.

Conventionally, when driving a car, a car navigation system, etc., is used, for the purpose of obtaining information relating to the road on which the car will run from now. Also, with information relating to traffic jam and accidents, there was already invented a system, in which such the information is provided through the teletext (i.e., text multi-channel) of radio broadcasting, for example, so as to be displayed on a display of the car navigation system, thereby transmitting those to a user, for example, in Japanese Patent Laying-Open No. Hei 10-73441 (1998).

With such the car navigation system, however, it is possible for a driver to know only about the road information, which was already registered in advance. Also, with such the information of the traffic jam and/or car accident, etc., it is impossible to transfer such information to the driver, swiftly and accurately, that is changing momently from one minute to the next, due to the time difference therebetween. In particular, such information as the traffic jam on a crossroad or a crossing, for example, just happening in the front, etc., i.e., the information that can be seen easily, through a visual inspection through eyes approaching to the crossing, however in the advance of, it can be obtained only in a degree; e.g., in the form of information, in which the jamming area is displayed, separately, with different colors on the text or a map.

BRIEF SUMMARY OF THE INVENTION

An object, according to the present invention, is to provide a terminal apparatus and an image information server, on which the information can be confirmed, in advance, about the information of a place and so on, where a car will pass through from now, within a vehicle, such as a car, etc., thereby enabling a safe driving while keeping composure.

For dissolving such the drawbacks mentioned above, according to the present invention, there is provided a terminal apparatus of a vehicle, such as a car, comprising: a position measuring means for measuring a present position; an image pick-up means, such as a camera, etc., being able to pick up an image of a front or a rear of the car; a transmitting means for uploading the image picked up, together with the position information, to an image information server for managing a database of image information being indicative of condition of a road; a receiver means for downloading a predetermined image from said image information server; and a display means for displaying said image received thereon, wherein: a place or a timing of picking up an image by said image pick-up means is controlled from said image information server.

Also, according to the present invention, there is provided an image information server for managing a database of image information indicative of condition of a road, comprising: a terminal apparatus having, a position measuring means for measuring a present position of a car, and an image pick-up means being able to pick up an image of a front or a rear of the car; a receiving means for receiving the image picked up by said image pick-up means, together with the position information; and a transmitting means for transmitting a predetermined image to said terminal apparatus, wherein: a place or timing where or when said image pick-up means owned by said terminal apparatus picks up an image is controlled from said image information server. And, the image information indicative of the condition of the road, which is uploaded from each of the vehicles, is collected up to the image information server, while each of the vehicles downloads the information existing in the image information server when it is running.

Further, according to the present invention, in the terminal apparatus as described in the above, an image indicative of condition of a road, being picked up when the car having said terminal apparatus passes through a first spot on the road designated in advance, is transferred to said image information server for managing the database of the image information indicative of road condition, and a terminal apparatus of a second car, which locates in a front of said first spot and will pass through said first spot, receives the image indicative of the condition of said first spot from said image information server, thereby enabling display of the image indicative of the condition of said first spot. With this, the car itself can confirm the condition of a spot through which it will run from now by using the information, which is picked up by other car passing through that spot just before.

Also, according to the present invention, in the terminal apparatus as described in the above, a price including a predetermined point, etc., can be obtained by picking up a condition of the road and/or transferring the image picked up to said image information server. And, also according to the present invention, a price including a predetermined point, etc. should be paid by receiving the predetermined image from said image information server and displaying said image received thereon.

BRIEF DESCRIPTION OF THE DRAWINGS

Those and other objects, features and advantages of the present invention will become more readily apparent from the following detailed description when taken in conjunction with the accompanying drawings wherein.

DESCRIPTION OF THE PREFERRED EMBODIMENTS

Figure 1:
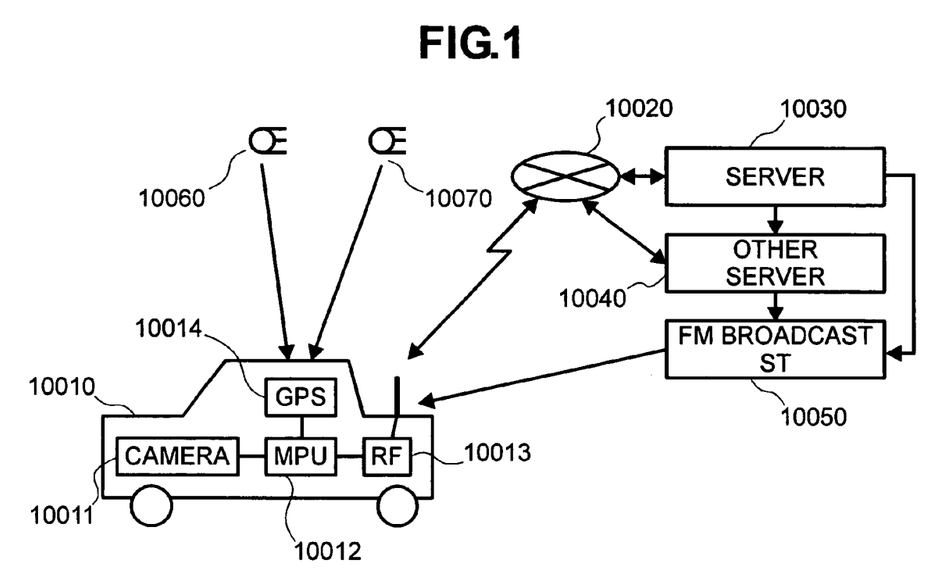
FIG. 1 is a brief configuration view of a system according to an embodiment of the present invention.

Hereinafter, embodiments according to the present invention will be fully explained by referring to the attached drawings. FIG. 1 shows a brief configuration of a system, according to an embodiment of the present invention.

A reference numeral 10010 is a car, on which are mounted functions provided according to the present invention. A reference numeral 10011 is a camera for picking up the peripheries of the car. A reference numeral 10012 is a controller apparatus (MPU) for controlling the functions mounted on the car. A reference numeral 10013 is a communicator apparatus (RF) for conducting wireless communication. A reference numeral 10014 is a GPS for obtaining position information of the car. A reference numeral 10020 is a communication network. A reference numeral 10030 is a server for conducting information management and image management/distribution at a provider side. A reference numeral 10040 is other server, which is managed by the provider, etc. A reference numeral 10050 is a FM broadcasting station. And, reference numerals 10060 and 10070 are GPS satellites.

On the car 10010, in which the present invention is applied, are mounted the camera 10011, the MPU 10012, the RF 10013, and the GPS 10014. The car 10010 on running is checked or confirmed on the present position thereof with using the GPS 10014. The MPU 10012 takes communication with the server 10030 through the communication network 10020, and determines timings (or places) of uploading and downloading of a pick-up image. When the MPU 10012 determines that it is the timing for picking up an image, it gives an instruction thereof to the camera 10012. The image information picked up is uploaded through the RF 10014 and the communication network 10020 to the server 10030. In the similar manner, when the MPU determined that it is the timing for the downloading, it gives a request of downloading to the server 10030, thereby conducting the down loading through the communication network 10020 and the RF 10014. Upon downloading, it is also possible to conduct the downloading of the information located in the other server 10030. And, it is also possible to adopt a method of conducting the same through the FM broadcasting station 100050, but without using the communication network 10020.

Figure 2:
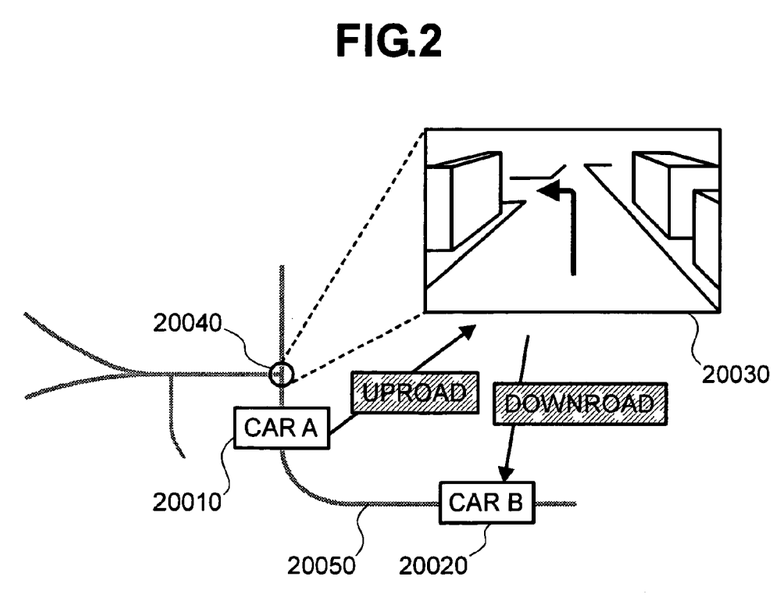
FIG. 2 is a view for explaining a scene of using, according to the embodiment of the present invention.

In FIG. 2 is shown a using method thereof, according the embodiment of the present invention.

A car "A" 20010 picks up an image on a crossing 20040 during the running in the vicinity thereof, and uploads the picked up image (or the pick-up image) thereof. Through downloading the pick-up image 20030 of the crossing 20040, it is possible for a driver on a car "B" 20020 to know the road condition of the crossing 20040, in advance, where the car will pass through from now.

Figure 3:
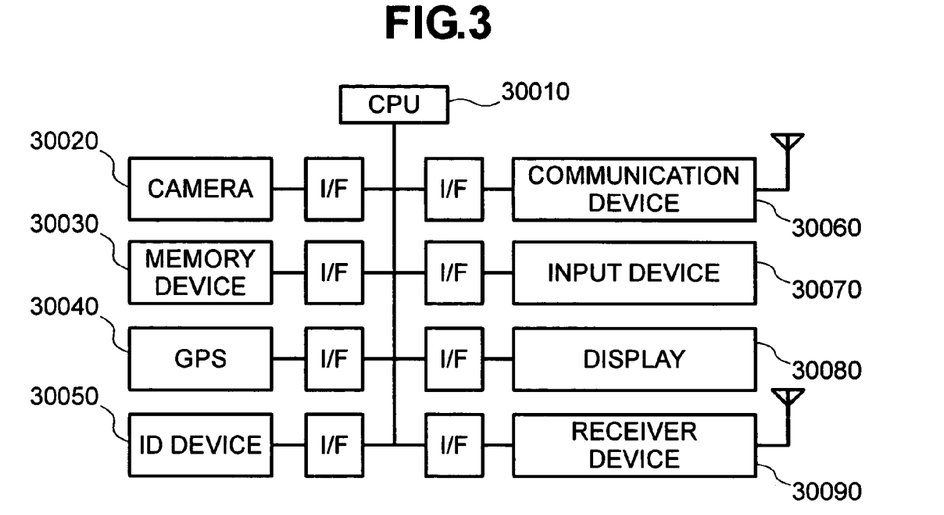
FIG. 3 is a structure view of a portion, which is mounted on a car, according to the embodiment of the present invention.

FIG. 3 shows the structure of appliances or equipments, which are mounted on the car, according to the embodiment of the present invention. A reference numeral 30010 is a CPU for controlling the appliances mounted on the car. A reference numeral 30020 is a camera. A reference numeral 30030 is a memory device, such as a DVD-ROM, a HDD, a memory card, etc., for reserving therein a map information and preset information, etc. A reference numeral 30040 is the GPS. A reference numeral 30050 is an identification device, such as, a key for use of identification of a user, an IC card, etc. A reference numeral 30060 is a communication device, such as a mobile telephone, etc., through which the communication is done with the server.

A reference numeral 30070 is an input device, such as, a touch panel, and a keyboard, etc. A reference numeral 30080 is a display. A reference numeral 30090 is a receiver device, such as a FM tuner for the teletext broadcasting, a beacon receiver, etc.

In this FIG. 2, the appliance on the car, always grasping the present position of itself with using the GPS 30040, has a function of picking up an image of the crossing in FIG. 2, with using the camera 30020, upon a request from the server, which will be mentioned later, and upon the present position information of itself, thereby transmitting it to the server with using the communication device 30060.

Also, in the similar manner, it has a function of making a request of an image of the crossing, to which it is directing from now, to the server through the communication device 30060 mentioned above, thereby displaying the image received on the display 30080. Those processes are conducted with using the CPU 30010, and also the necessary inputs from the user are conducted with using the input device 30080.

Figure 4:
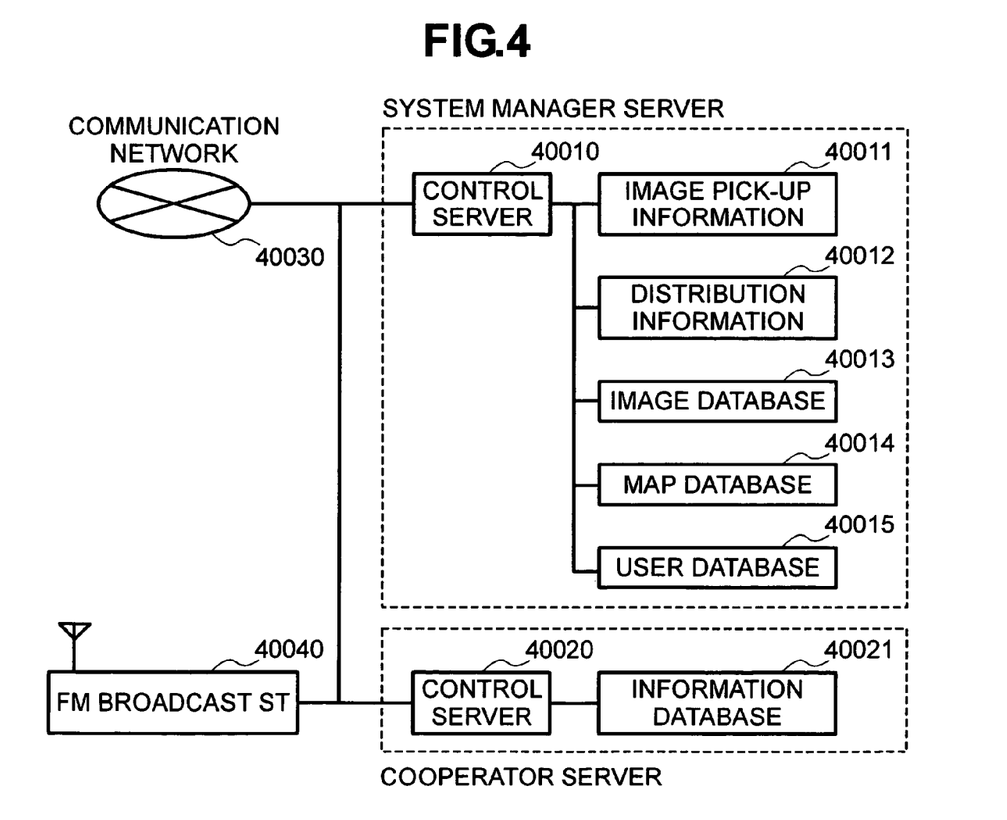
FIG. 4 is a structure view of a server, according to the embodiment of the present invention.

FIG. 4 shows the structure of the server side, according to the embodiment of the present invention.

A reference numeral 40010 is a control server, which is provided by a system manger. A reference numeral 40011 is image pick-up information, to which reference is made when determining the image pick-up timing and/or the place for picking up an image thereof. A reference numeral 40012 is distribution information, to which reference is made when determining the information distribution timing and/or the place for distribution. A reference numeral 40013 is an image database for reserving the image information therein. A reference numeral 40014 is a map database for reserving the map information therein. A reference numeral 40015 is a user database for reserving the user information therein. A reference numeral 40020 is a control server, which is prepared by the provider, etc. A reference numeral 40030 is a communication network. And a reference numeral 40040 is a FM broadcasting station.

Figure 5:
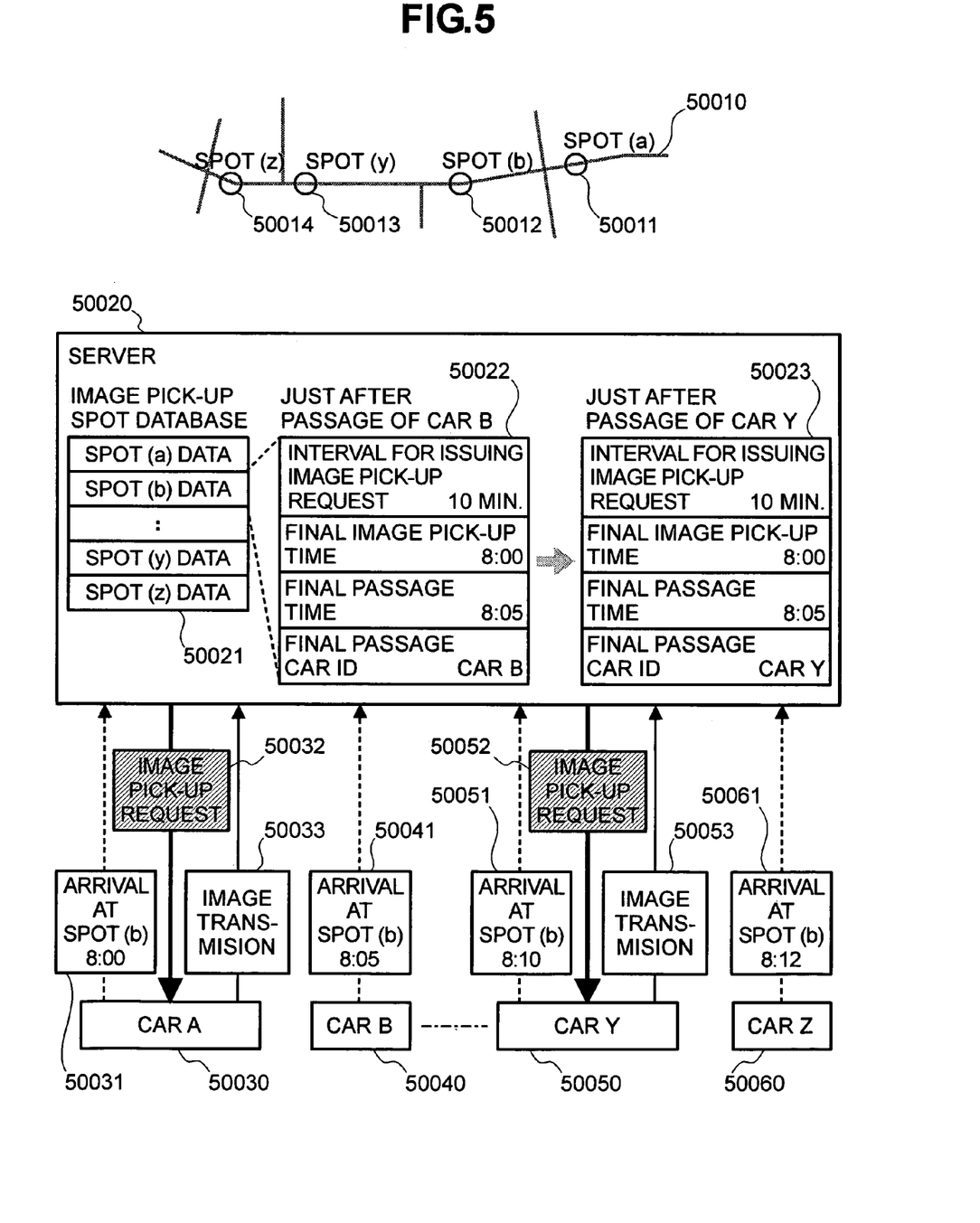
FIG. 5 is a view for explaining uploading, according to the embodiment of the present invention.

The server conducts communication with the appliance or equipment mounted on the car, in accordance with an operation flow, which will be mentioned by referring to FIG. 5 and those thereafter, and it also conducts the following operations; such as, an instruction for image pick-up to the appliance on the car and/or receipt of the image data, transmission of images depending upon the requests from the appliance mounted on the car, and also the identification of the user accompanying therewith, as well as point calculations, etc.

Explanation will be given on the embodiment, according to the present invention, by referring to FIGS. 5, 6, 7, 8 and 9.

Figure 6:
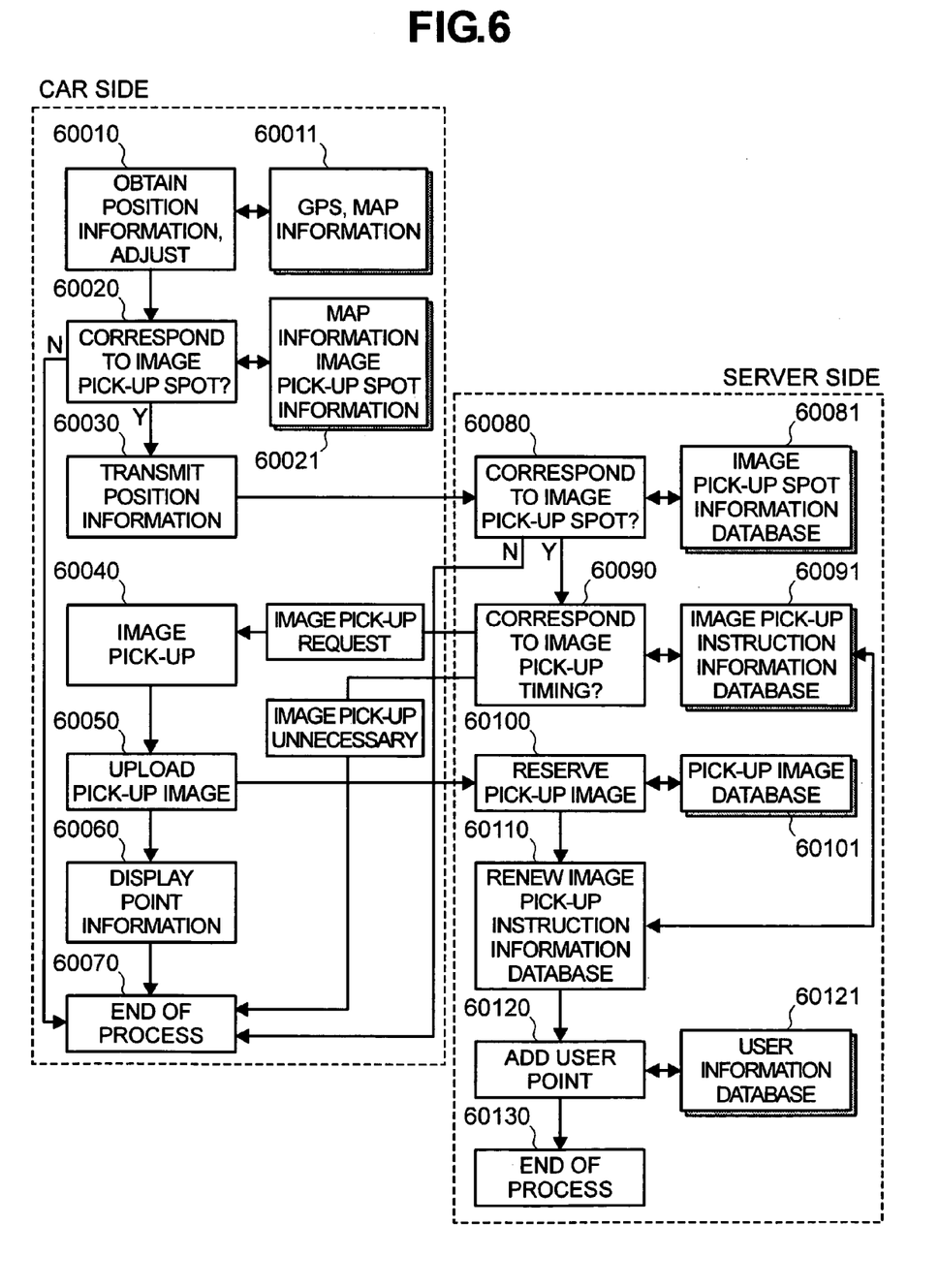
FIG. 6 is a flowchart of the uploading, according to the embodiment of the present invention.
Figure 9:
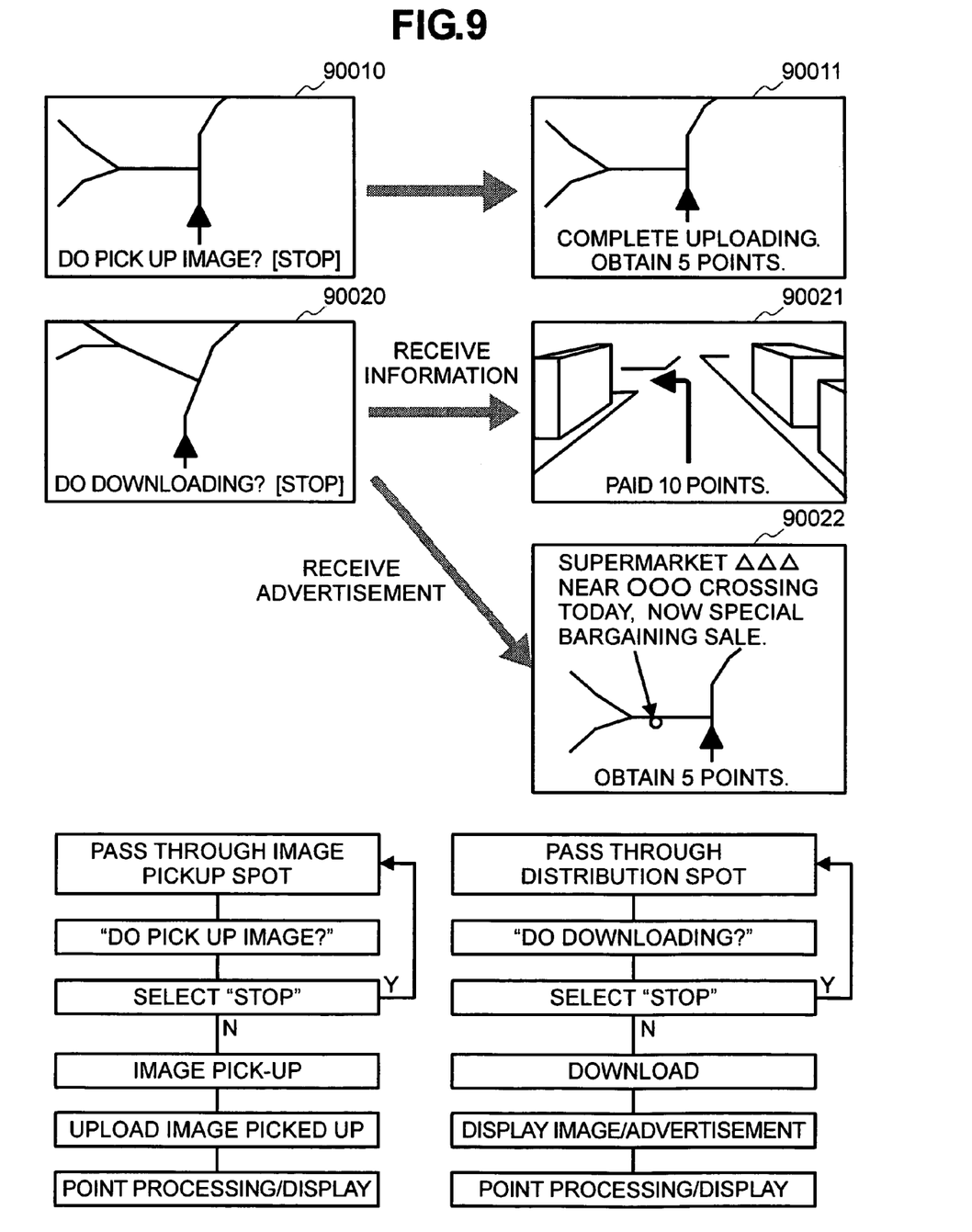
FIG. 9 shows an example of a screen, according to the embodiment of the present invention.

First of all, explanation will be given on the uploading of the image picked up (i.e., the pick-up image), by referring to FIGS. 5, 6 and 9.

In FIG. 5, it is assumed that the cars are running on a road 50010, in the order: a car "A" 50030, a car "B" 50040, a car "Y" 50050, and a car "Z" 50060, for example. And, in this instance, all of the cars pass through a spot (a) 50011, a spot (b) 50012, a spot (y) 50013, and a spot (z) 50014, in that sequence. In a server 50020, there is an image pick-up spot database 50021, into which is registered and/or set up an image picking up method, etc.

As an example, explanation will be given on the processes conducted in each of the cars when passing through the spot (b) 50012.

Now assuming that:

the car "A" 50030 passes through at "8:00", and picked up the image of the spot; and the car "B" 50040 passes through at "8:05", but picked up no image of that spot, then, at that time, the spot (b) database within the image pick-up spot database 50021 of the server 50020 is 50022. In this spot (b) database is set up/registered: an interval for issuing the image pick-up request (ten (10) minutes); a final image pick-up time (8:00); a final passage time (8:05); and a final passage car ID (the car "B"). Since it is not necessary for all of the cars to pick up the image, therefore the request for image pick-up is made to a designated car at a certain time period or an interval. This certain time interval is variable, and at the spot (b), the time interval for issuing the image pick-up request is set at ten (10) minutes.

Explanation will be given about the process flow of the car "Y" 50050, which will pass through the spot (b) 50012 next, by referring to FIG. 6, in this time.

The car "Y" 50050 is always conducts "obtain position information, adjust" 60010 by using "GPS, map information" 60011. In "map information, image pick-up spot information" 60021 is registered an image pick-up spot, and in "correspond to image pick-up spot?" 60020, it is determined on whether an image should be picked up or not. Herein, since the spot (b) 50012 is the image pick-up spot, therefore the position information is transmitted to the server 50012 in "transmit position information" 60030.

In the server 50012, confirmation is made on whether "correspond to the image pick-up spot?" or not in 60080, by using an "image pick-up spot information database" 60081. Herein, since the spot (b) 50012 is the image pick-up spot, "correspond to image pick-up timing?" is determined, by using an "image pick-up instruction information database" 60091. The "interval for issuing image-pick up request" at the spot (b) 50012 at this time is set at "ten (10) minutes", and the "final passage time" is "8:00". Because the car "Y" 50050 passed through at "8:10", and therefore already ten (10) minutes passes by from the time "8:00" of the "final passage time", therefore the image pick-up request is issued. Instructing and controlling the timing for image pick-up from the server enables to reduce and amount of traffic of the transmission. The car "Y" 50050 receiving the image pick-up request conducts "image pick-up" 60040, and then "upload pick-up image" 60050. And, thereafter, it conducts "display point information" 60060 (a displaying example 90010) and then "end of process" 60070.

In the server 50012 receiving the uploading, "reserve pick-up image" 60100 is conducted into a "pick-up image database" 60101. The image pick-up spot database at the spot (b) 50012 comes to be as indicted by 50023, after conducting "renew image pick-up instruction information database" 60110. "Add user point" 60110 is conducted with respect to "user information database" 60121, and then "end of process" 60120.

Next, explanation will be given about the downloading, by referring to FIGS. 7, 8 and 9.

Figure 7:
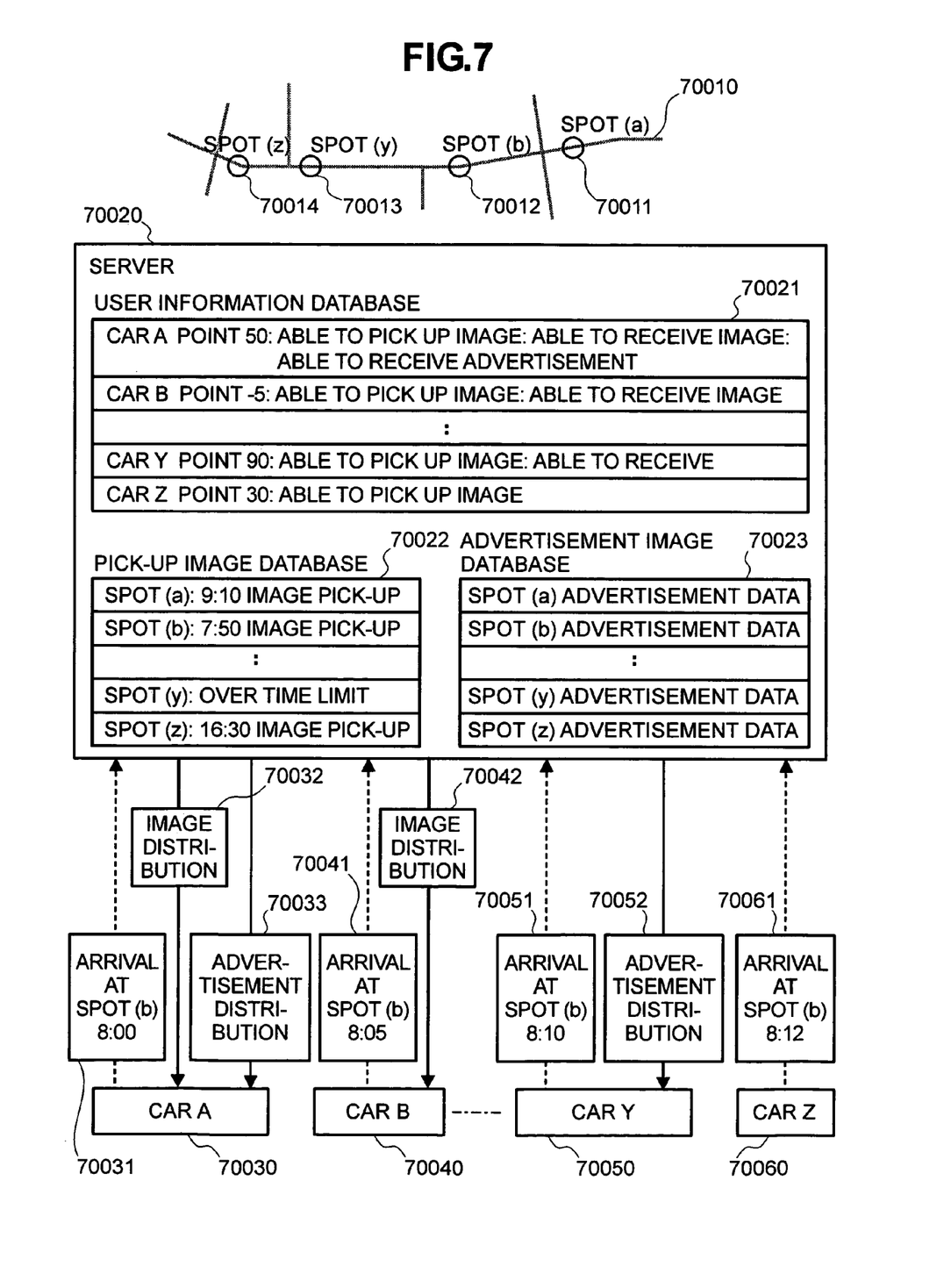
FIG. 7 is a view for explaining downloading, according to the embodiment of the present invention.
Figure 8:
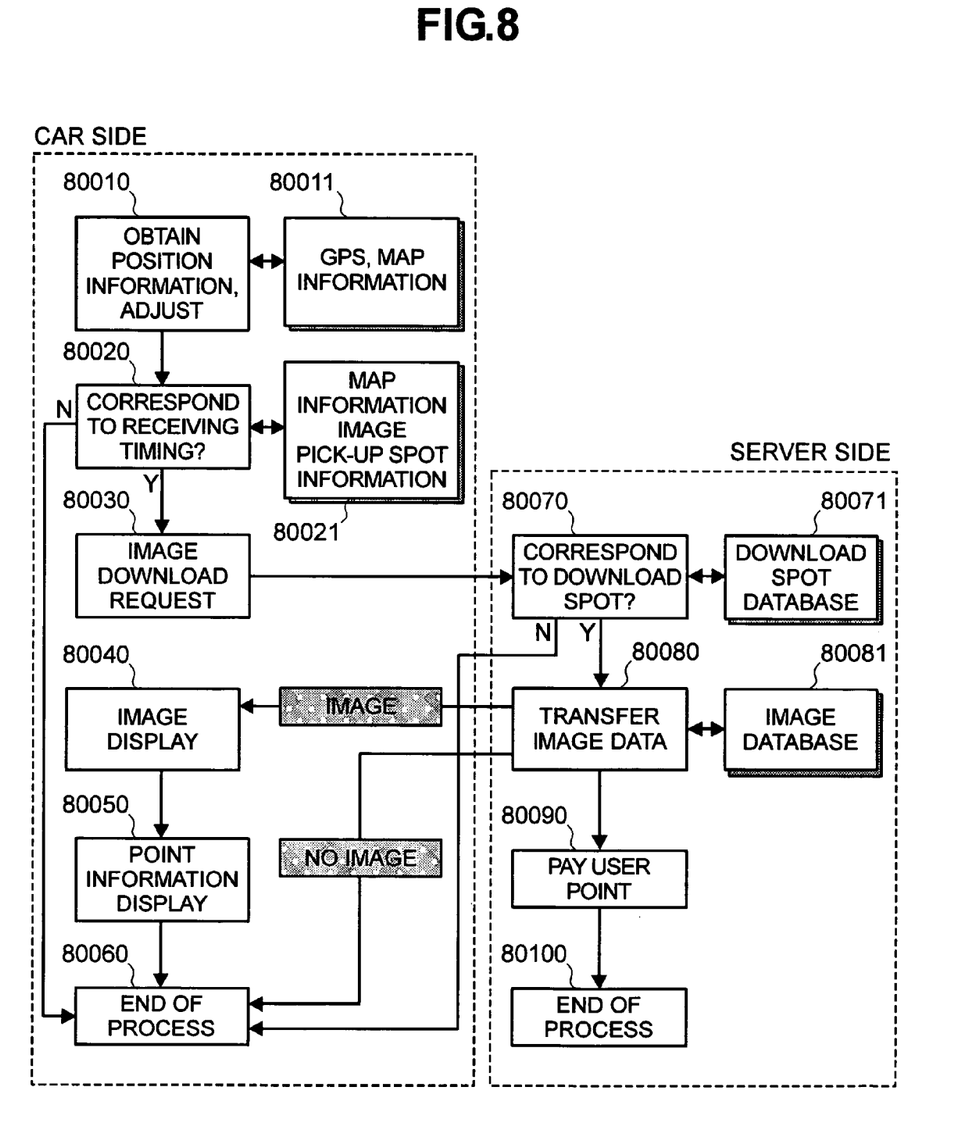
FIG. 8 is a flowchart of the downloading, according to the embodiment of the present invention.

In FIG. 7, it is assumed that a car "A" 70030, a car "B" 70040, a car "Y" 70050 and a car "Z" 70060 are running on a road 70010, in that order. In this time, it is also assumed that all of the cars pass through a spot (a) 70011, a spot (b) 70012, a spot (y) 70013 and a spot (z) 70014, in that sequence. In the server 70020 are provided a user information database 70021, a pick-up image database 70022, and an advertisement image database 70023.

Explanation will be given on the processes in each of the cars, when passing through the spot (b) 70012.

The car "A" 70030 passing through the spot (b) 70012 makes the image request to the server 70012.

The information of the car "A" 70030 in the user information database 70021 is set to be "able to receive image" and "able to receive advertisement". As information of the spot (b) 70012 in the pick-up image database 70022, the image is registered, which was picked up at 7:50. As information of the spot (b) in the advertisement image database 70023 is registered an advertisement data.

The server 70012 receiving the request conducts "image distribution" 70032 and "advertisement distribution" 70033 conducts the advertisement.

In the similar manner, in the car "B", as the information of the car "B" 70040 is registered only "able to receive image" in the user information database 70021, therefore only "image distribution" 70042 is conducted, but no advertisement distribution.

Figure 10:
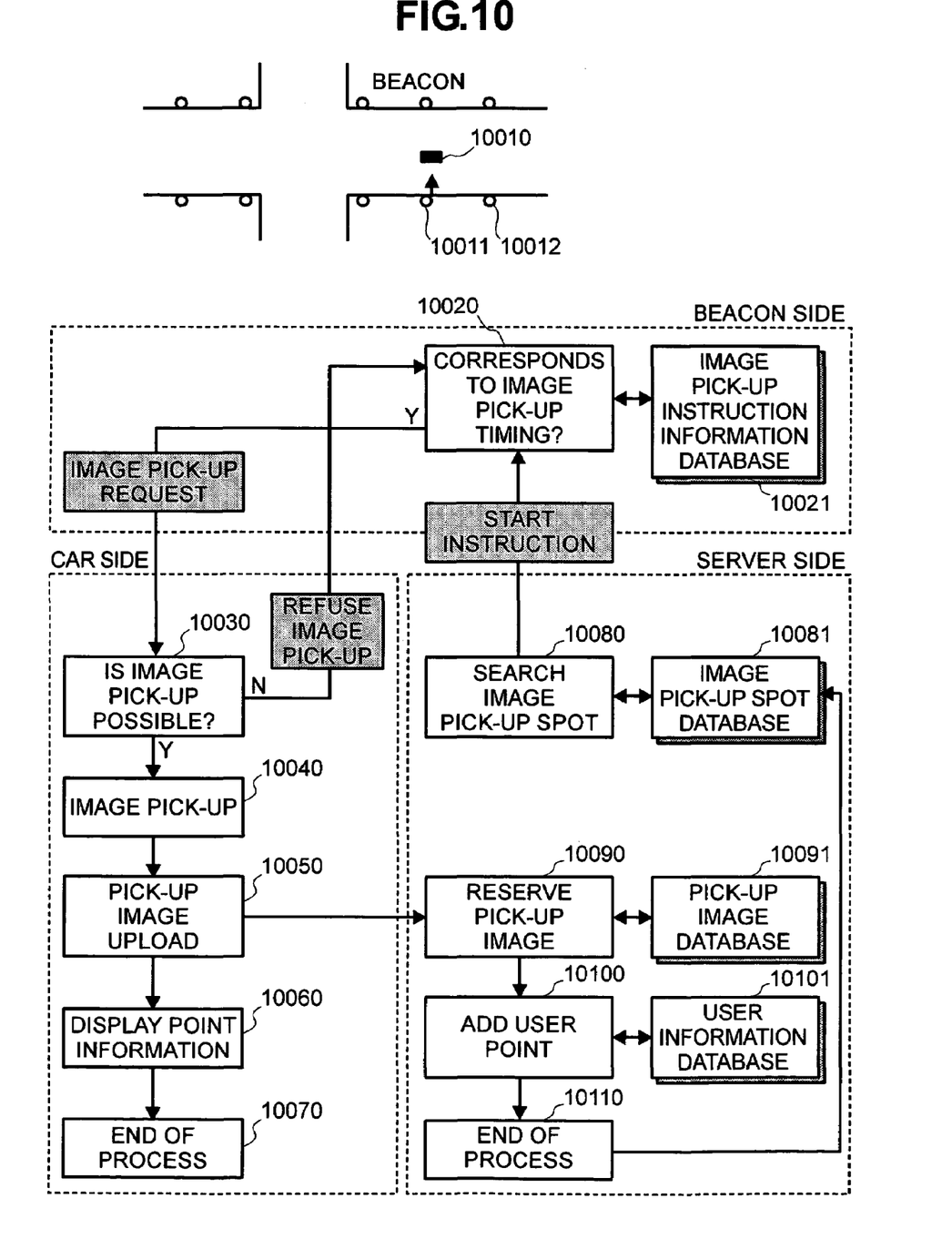
FIG. 10 is a view for showing a second embodiment of the present invention.

FIG. 10 shows a second embodiment according to the present invention.

In the embodiment explained hereinbefore, though the timing of picking up an image is so determined that, first the present position information is given from a side of the car to a aside of the server, for the server to determine on whether an image should be picked up or not, and then the image pick-up request is transferred to the side of the car, however, as a method for simplifying the processes of determining the image pick-up timing, it is also possible to utilize a fixed wireless communication apparatus, such as, a beacon, etc., which is located on a side of the road.

The car (10010) picks up an image, on the chance of the image pick-up request given from a beacon 10012, and conducts uploading thereof. Actually, the server conducts "search image pick-up spot" 10080 by using the "image pick-up spot database" 10081, and it gives an instruction of requesting a start of picking-up of an image to the beacon located at the corresponding spot. Within the beacon receiving such the request, confirmation is made on whether the image pick-up timing is corresponding to or not (10020) by using the image pick-up instruction database 10021, and it issues the image pick-up request to the car if it corresponds thereto.

In the car receiving such the request, it is determined on whether the image pick-up is possible (or available) or not (10030), and if being possible, it conducts the image pick-up (10040), thereby conducting the uploading thereof (10050). Thereafter, it conducts the point display (10060), and the end of process (10070).

Receiving the uploading thereof, the server makes reservation (10090) of the pick-up image into the pick-up image database 10091, and it conducts addition of point (10100) to the user information database 10101. Thereafter, in the end of process 10110, renewal is conducted upon the image pick-up spot database 10081, and the instruction is stopped for a moment to be given to the beacon, requesting the start of image pick-up. After passing by the image pick-up interval, which is registered in the image pick-up spot database 10081, the instruction is started, again, instructing the start of image pick-up to the beacon.

Figure 11:
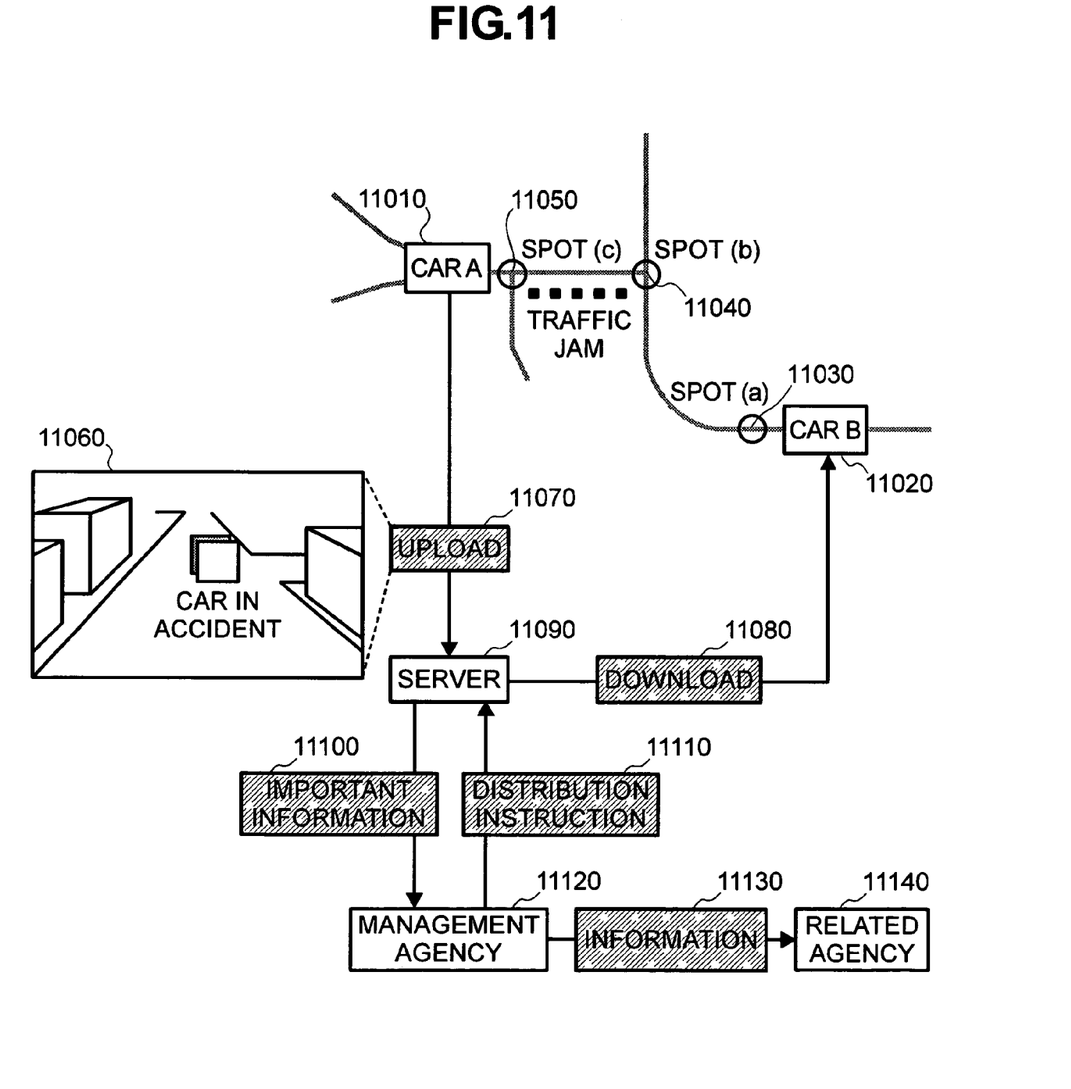
FIG. 11 is a view for showing a third embodiment of the present invention.

FIG. 11 shows a third embodiment according to the present invention.

In the first embodiment, though the information to be downloaded is the image registered for use of the passage spot, however also a method can be considered, in which the important information is distributed with priority, as a process when a car accident and/or a traffic jam occur ordinarily, the image being downloaded by the car "B" 11020 passing through the spot (a) 11030 is the image of the spot (b) 11040.

When the car accident happens at the spot (c) 11050, however for the car "B" 11020, the important information is the image of the spot (c) 11050 where the car accident happens, than that image of the spot (b) 11040.

As a method, the car "A" 11010 picks up an image of the spot (c) 11050, and the fact is added thereto that it is the important information, in a stage of conducting the uploading of the image 11060, which is picked up through the user's operation. In the server 11090, when the important information is uploaded, thst information is transferred to a management agency or facility 11120, thereby to confirm on whether it is actually the important information or not. When determining that it is the important information, it gives a notice or information 11130 to a related agency 11140, such as, the police, etc., and also at the same time, a notice of information 11110 to the server 11090, so that it distributes the information as the information to the periphery of the field where the accident occurs, giving priority thereto than the ordinary image thereof.

Figure 12:
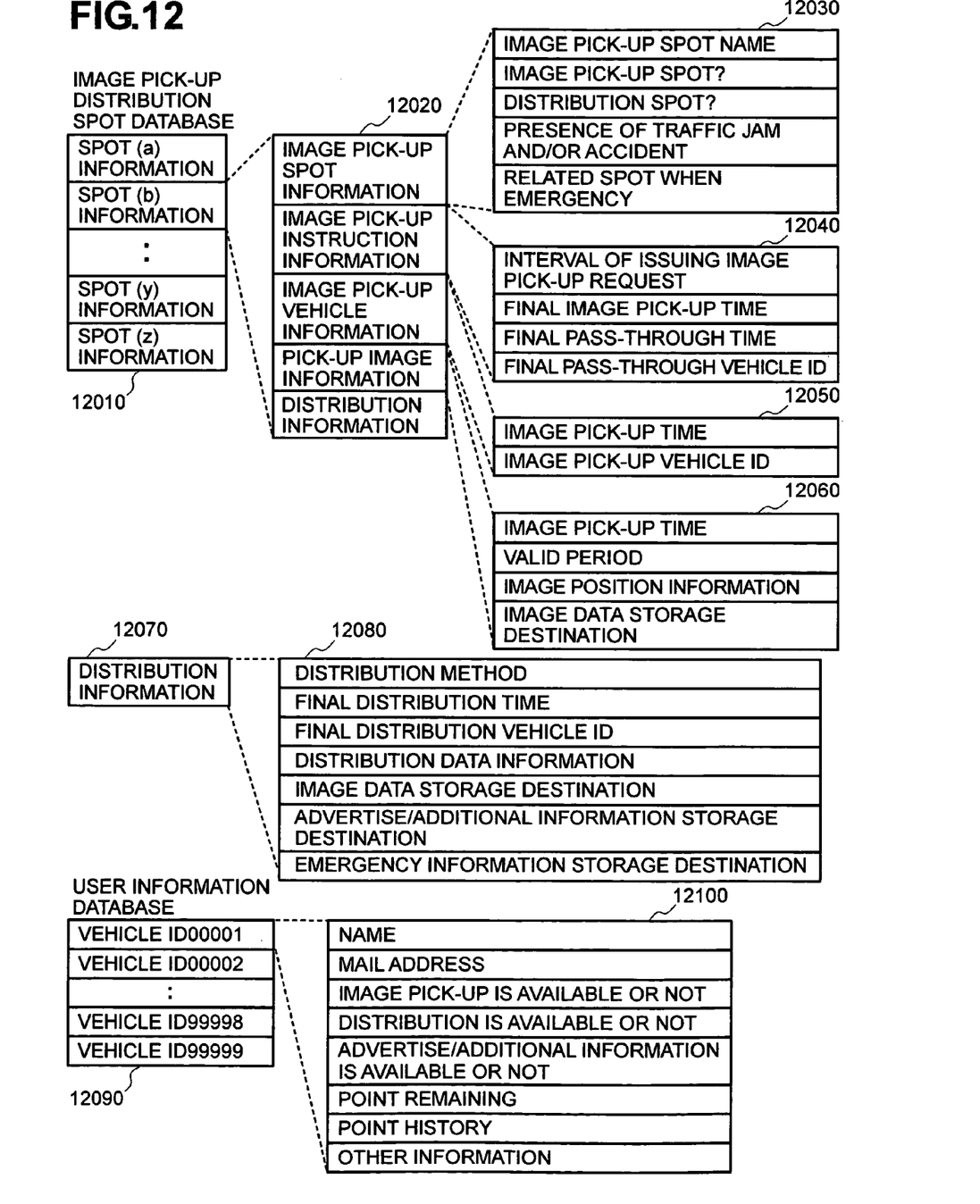
FIG. 12 shows an example of data management, according to the embodiment of the present invention.

FIG. 12 shows an example of data management.

The databases, which are prepared on the server, include an image pick-up distribution spot database 12010, and the user information database 12090.

The image pick-up distribution spot database 12010 is the database, for conducting set-up of a method for image distribution and registration of data, and it has information, each being aligned at every spots. Herein, in the spot (b) information 12020, there are included: image pick-up spot information 12030; image pick-up instruction information 12040; image pick-up car information 12050; pick-up image information 12060; and distribution information 12080.

In the user information database 12090 are registered the set-up information for each of the users.

Figure 13:
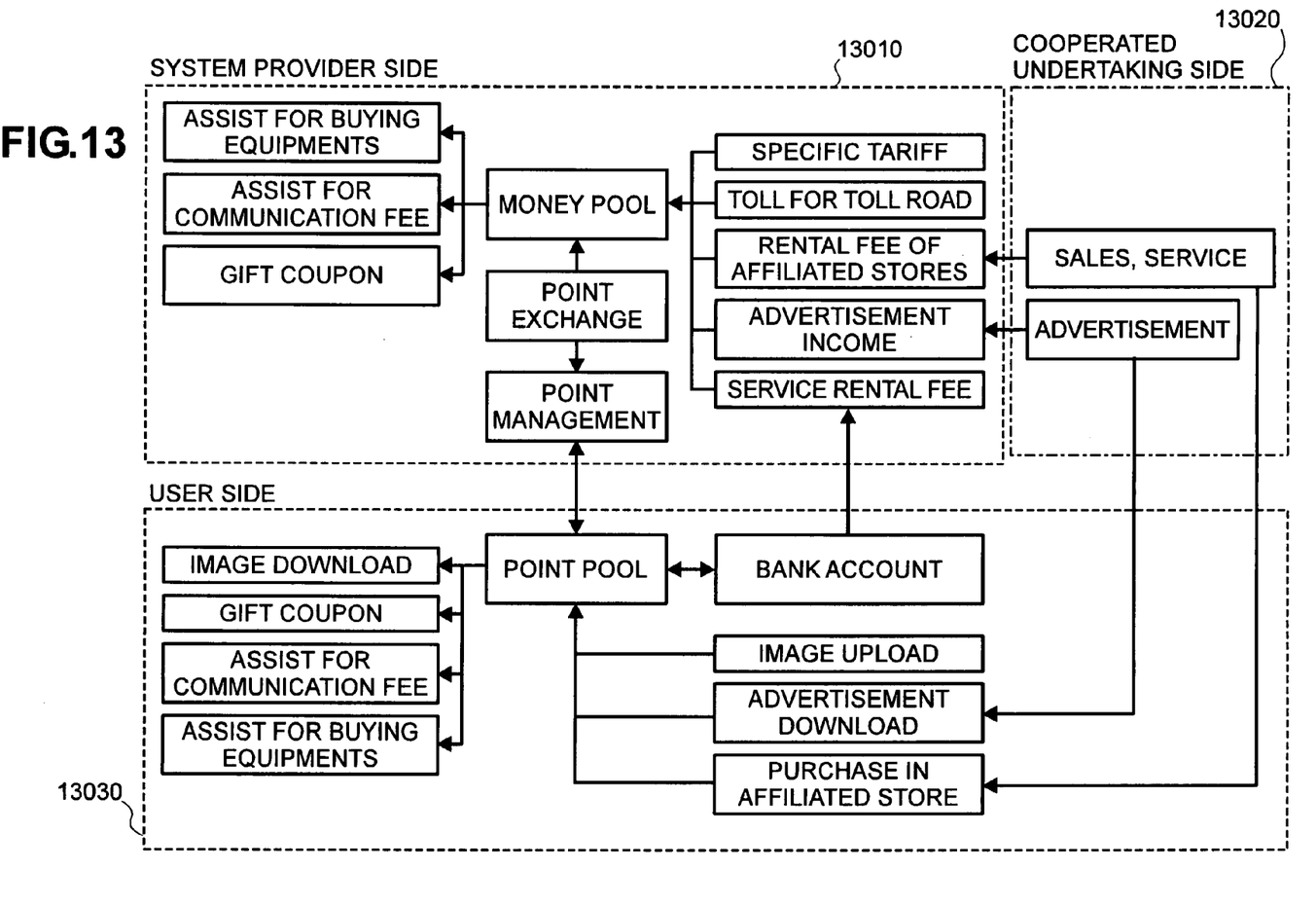
FIG. 13 shows an example of a money flow, according to the embodiment of the present invention.

FIG. 13 shows a money flow.

The system is built up, by circulating the points, moneys and services, among three (3) parties; i.e., a system provider 13010, a sponsor undertaking 13020, and a user 13030, for example.

The system provider 13010 makes management upon the basis of the rental fee obtained from the user 13030, advertising revenue obtained from the sponsor undertaking 13020, etc., and gives an assistance to the user 13030 for purchasing, by the means of the points.

The sponsor undertaking 13020 pays advertising rate to the system provider 13010, as well as, fee for preferred selling right to the user 13030, and it conducts the distribution of advertisement, selling of goods, etc., to the user 13030.

For the user 13030, an increase/decrease occurs on the points through using the services provided by the system provider 13010 and the sponsor undertaking 13020, and the user can receive a discount of the service rental fee and/or the assistance for purchasing various equipments, depending upon the remaining amount of the points.

Figure 14:
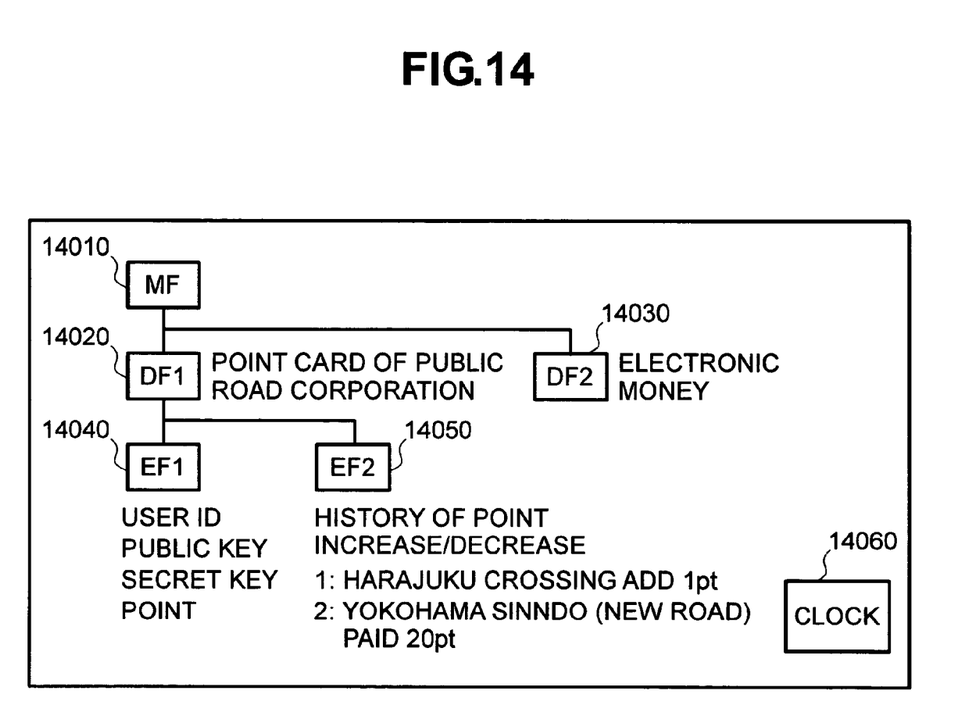
FIG. 14 is a view for showing card information, according to the embodiment of the present invention.

FIG. 14 shows card information.

The user can join into the present system by means of an IC card, i.e., through an IC card reader function mounted on the car. This is for the purpose of identifying the user her/himself, and there are registered the information for the identification and other information, such as the points, etc.

The IC card described in the present embodiment, including MS (Master File) 14010 as a root therein, has a plural numbers of DFs (Dedicated Files) in the lower rank thereof. Thus, DF1 14020 is a point card of a public corporation of road, which is used in the present invention, and DF2 14030 is used for the electronic money system, for example. Further, below the DF1, there are provided a plural numbers of EFs (Elementary Files); i.e., EF1 is a public key or a secret key for use of conducting cryptography (or, ciphered communication) of the user ID and/or the personal information, and also is described therein the pint data that the user has, and so on. Within EF2 remains a record of processing history, in more details, a history of the points; for example, there is described such the information, that one (1) point is obtained through pick-up of an image and uploading thereof at Harajuku (i.e., an area name in Tokyo) crossing, and that twenty (20) points are consumed through the downloading of images on Yokohama Shindou (i.e., Yokohama new road).

In the CPU card, the DF and the EF are made up with programs; therefore it is only possible to read out detailed information therefrom, or rewrite the history of infringement or violation, when a specific command is inputted from an outside thereof. This specific command can be done by means of software for exclusive use thereof, or a chip for exclusive use thereof which will be mentioned later. With this, it is possible to keep the secrecy of an inside information of the card, and to prevent it from change thereof. Also, for giving guarantee on the times of those information, a reliable clock 14060 may be provided within the card, thereby giving guarantee on the time information attached with the information, by using this. This clock, with using the characteristics of the CPU card mentioned above, steps on the processes of using the accurate time information obtained from the GPS, etc., but without change, thereby being able to keep the time information, being always accurate.

As was fully explained in the above, according to the present invention, for the driver of a car, since being possible to confirm the information about the spot where the car will pass through from now, in advance, therefore it is possible to drive the car safely, while keeping composure. Also, for investments, such as, being paid for the camera and the communication equipments, etc., which are mounted on the car, it is supported or subsided by means of the points, and the user can obtain the point through the use of the equipments, simply but without bearing such the investments, therefore being able to collects the investments for the equipments, and for the service system, there is no necessity of providing the cameras at each crossings by itself, but it is possible to obtain the images of the crossings in a real-time base and with ease, thereby using them effectively for the purpose of management of information of such the traffic jam; therefore it is possible to guarantee a mutual profit for both of them. Further, instructing and controlling the timing for picking up the image from the server brings about reduction in an amount of traffic of the transmission.

According to the present invention, it is possible for a driver to confirm the information, while staying within a vehicle, such as a car, for example, about a spot, etc., where the car will pass through from now, in advance and with ease, thereby achieving a safe driving while keeping composure.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A terminal apparatus, comprising:
 a position measuring means for measuring a present position of a car;
 an image pick-up means being able to pick up an image of a front or a rear of the car;

a transmitting means for transmitting the image picked up by said image pick-up means, together with the position information, to an image information server for managing a database of image information being indicative of condition of a road;

a receiver means for receiving image picked up by other terminal being mounted on other car from said image information server;

a display means for displaying said image received thereon; and an input device which receives information indicating importance of the image picked up by the image pick-up means;

wherein:

a place or a timing of picking up an image by said image pick-up means is controlled from said image information server, if information indicating importance of the image picked up by the image pick-up means is received by the input device, the transmitter transmits notice information to the image information server so that the image information server distributes the image with priority.

2. An information obtaining system, comprising:

an image information server which stores image information and distributes the stored image information;

a beacon which is located near a road; and a terminal which is mounted on a car, the terminal has a camera being able to pick up the periphery of the car, a beacon receiver which receives information transmitted by the beacon, a transmitter which transmits image information picked up by the camera, an input device which receives information indicating importance of the image information picked up by the camera, a receiver which receives image information picked up by other terminal being mounted on other car from the imaqe information server, and a display which displays the received image information;

wherein, when the beacon receiver receives image pick-up request information from the beacon, the camera picks up the periphery of the car and the transmitter transmits an image information picked up by the camera;

wherein, if information indicating importance of the image information picked up by the camera is received by the input device when the transmitter transmits the image information.

3. The information obtaining system according to claim 2, wherein the beacon transmits image pick-up request information when the beacon receives an instruction of requesting a start of picking up of an image from the image information server.

4. A terminal being mounted on a car and able to communicate with an image information server and a beacon, the image information server stores image information and distributes the stored image information, the beacon which is located near a roads comprising:

a camera being able to pick up the periphery of the car;

a receiver which receives information transmitted by the beacon;

a transmitter which transmits image information picked up by the camera; and an input device which receives information indicating importance of the image information picked up by the camera, a receiver which receives image information picked up by other terminal being mounted on other car from the image information server, and a display which displays the received image information;

wherein, when the beacon receiver receives image pick-up request information from the beacon, the camera picks up the periphery of the car and the transmitter transmits an image information picked up by the camera;

wherein, if information indicating importance of the image information picked up by the camera is received by the input device when the transmitter transmits the image information.

\* \* \* \* \*